US010113691B2

(12) United States Patent
Grieve

(10) Patent No.: US 10,113,691 B2
(45) Date of Patent: Oct. 30, 2018

(54) STABILISING DEVICE

(71) Applicant: SAFETRAY PRODUCTS LIMITED, Edinburgh (GB)

(72) Inventor: Alison Grieve, Edinburgh (GB)

(73) Assignee: SAFETRAY PRODUCTS LIMITED, Edinburgh (GB)

( * ) Notice: Subject to any disclaimer, the term of this patent is extended or adjusted under 35 U.S.C. 154(b) by 0 days.

(21) Appl. No.: 14/786,589

(22) PCT Filed: Apr. 25, 2014

(86) PCT No.: PCT/GB2014/051307
§ 371 (c)(1),
(2) Date: Oct. 23, 2015

(87) PCT Pub. No.: WO2014/174319
PCT Pub. Date: Oct. 30, 2014

(65) Prior Publication Data
US 2016/0069512 A1    Mar. 10, 2016

(30) Foreign Application Priority Data

Apr. 26, 2013  (GB) .................................. 1307605.4

(51) Int. Cl.
*B65G 7/12*      (2006.01)
*F16M 13/04*    (2006.01)
*A45F 5/00*      (2006.01)
*G06F 1/16*      (2006.01)
*A45F 5/10*      (2006.01)
*F16M 13/06*    (2006.01)

(52) U.S. Cl.
CPC .............. *F16M 13/04* (2013.01); *A45F 5/00* (2013.01); *A45F 5/10* (2013.01); *F16M 13/06* (2013.01); *G06F 1/1626* (2013.01); *A45F 2005/008* (2013.01); *A45F 2200/0525* (2013.01); *G06F 2200/1633* (2013.01)

(58) Field of Classification Search
CPC .......... F16M 13/04; F16M 13/06; A45F 5/00; A45F 5/10; A45F 2005/008; A45F 2200/0516; A45F 2200/0525; G06F 1/1626; G06F 2200/1633
USPC ......................................................... 294/25
See application file for complete search history.

(56) References Cited

U.S. PATENT DOCUMENTS

| 8,382,059 | B2 * | 2/2013 | Le Gette | ................ F16M 11/04 248/163.1 |
| 8,490,789 | B2 | 7/2013 | Lach et al. | |
| 8,690,210 | B1 * | 4/2014 | May | ........................ A45F 5/00 224/217 |

(Continued)

FOREIGN PATENT DOCUMENTS

| WO | WO 2011/107786 A1 | 9/2011 |
| WO | WO 2012/016281 A1 | 2/2012 |
| WO | WO 2012/087371 A1 | 6/2012 |

OTHER PUBLICATIONS

International Search Report for PCT/GB2014/051307 dated Aug. 5, 2014.

*Primary Examiner* — Gabriela M Puig
(74) *Attorney, Agent, or Firm* — Pepper Hamilton LLP

(57) ABSTRACT

A stabilizing device for a portable computing device, a display system comprising the stabilizing device and a portable computing device, and the use of a stabilizing device for holding a portable computing device are described.

20 Claims, 5 Drawing Sheets

(56) References Cited

U.S. PATENT DOCUMENTS

| | | | |
|---|---|---|---|
| 8,740,270 B1* | 6/2014 | Mizell | A45F 5/00 |
| | | | 224/217 |
| 8,794,686 B2 | 8/2014 | Grieve | |
| 9,145,158 B2* | 9/2015 | Cruz | B62B 9/26 |
| 9,267,642 B2* | 2/2016 | Enkerlin | F16M 11/10 |
| 9,300,346 B2* | 3/2016 | Hirsch | H04B 1/385 |
| 2004/0226973 A1 | 11/2004 | Kao | |
| 2011/0025176 A1* | 2/2011 | McClure | A47B 23/042 |
| | | | 312/223.2 |
| 2011/0247959 A1 | 10/2011 | Nelson | |
| 2011/0279959 A1 | 11/2011 | Lopez | |
| 2011/0303709 A1 | 12/2011 | Wizikowski | |
| 2012/0025684 A1 | 2/2012 | Trotsky | |
| 2012/0048873 A1 | 3/2012 | Hyseni | |
| 2012/0068043 A1 | 3/2012 | Daigle et al. | |
| 2012/0075799 A1 | 3/2012 | Pollex | |
| 2012/0091312 A1 | 4/2012 | Baker | |
| 2012/0097831 A1 | 4/2012 | Olukotun et al. | |
| 2012/0104185 A1 | 5/2012 | Carroll | |
| 2012/0106054 A1* | 5/2012 | Royz | F16M 11/10 |
| | | | 361/679.3 |
| 2012/0113572 A1 | 5/2012 | Gadadis, II et al. | |
| 2012/0170194 A1* | 7/2012 | Lord | G06F 1/1632 |
| | | | 361/679.02 |
| 2012/0228346 A1 | 9/2012 | Huang | |
| 2015/0115112 A1* | 4/2015 | Noh | A45F 5/021 |
| | | | 248/126 |

* cited by examiner

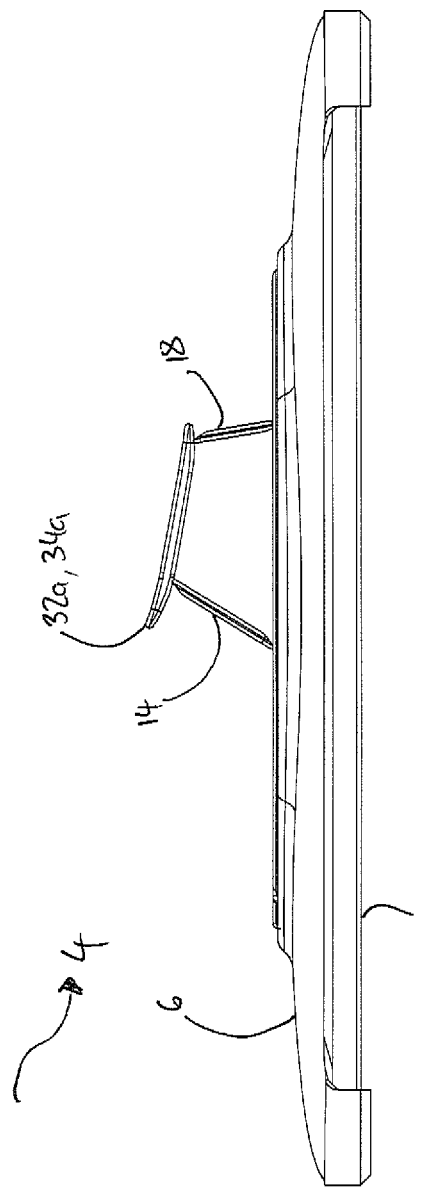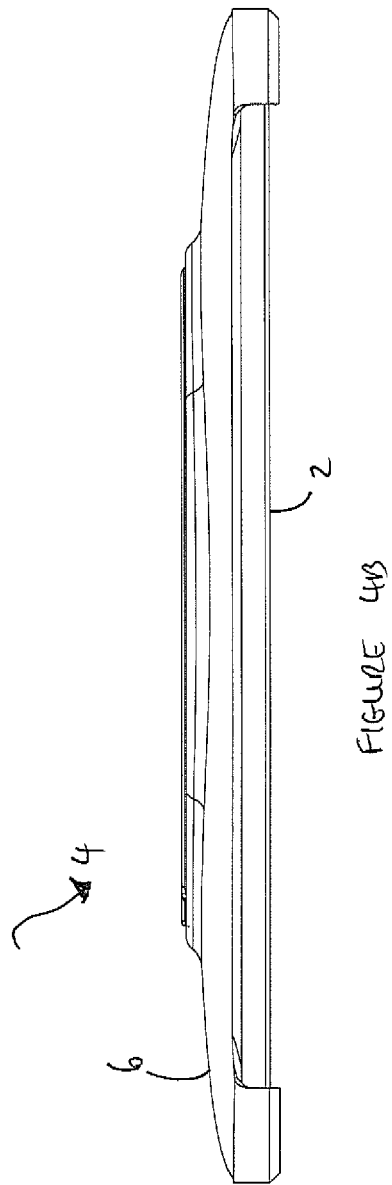

STABILISING DEVICE

CLAIM OF PRIORITY

This application is a U.S. national stage filing under 35 U.S.C. § 371 of International Application No. PCT/GB2014/051307 filed on Apr. 25, 2014 entitled "STABILISING DEVICE," which claims priority from Great Britain Patent Application Number 1307605.4 filed on Apr. 26, 2013, both of which are incorporated herein by reference in their entirety.

FIELD OF THE INVENTION

The present invention relates to a stabilising device, particularly to a stabilising device for a portable computing device, to a display system comprising a stabilising device and a portable computing device, and to the use of a stabilising device for holding a portable computing device.

BACKGROUND OF THE INVENTION

Portable computing devices, also known as tablet computers, or tablets, are popular computing devices which allow users to work, check e-mail, play games, take photos and suchlike while on the move, and are rapidly replacing traditional desktop computers as the consumer's choice of computing device.

One particular feature of many portable computing devices is that the device can detect which orientation it is in and automatically switch or flip and resize the displayed image to best fit that orientation. A user can therefore rotate the portable computing device during use, depending on the application and image, to best view the image at any given moment.

However, if a user is moving about and holding the portable computing device in one hand, it can be unwieldy to manipulate and rotate the portable computing device and there exists a risk that the user may fumble the portable computing device, lose control of it and drop it.

It is known to provide protective cases for portable computing devices, and rigid carry handles, grips or straps for holding these devices.

However, such arrangements can be bulky, and cumbersome for the end user, and do not allow a user to efficiently resist a rotational force applied to the portable computing device.

There is a continued need to address at least some of the issues mentioned above.

SUMMARY OF THE INVENTION

According to a first aspect of the present invention there is provided a stabilising device for a portable computing device, the stabilising device comprising:
  a base plate configured to be mounted on the portable computing device and rotatable relative to the portable computing device;
  at least one finger support member; and
  at least one spacer element connected to the finger support member and to the base plate; wherein;
  the finger support member is moveable between a closed position in which the finger support member is substantially flush with the base plate and an open position in which the finger support member is spaced from the base plate such that a user can insert at least one finger between the base plate and the finger support member.

When using a stabilising device in accordance with the present invention, a user can effectively and safely react against the rotational force exerted when the orientation of the portable computing device is switched, and effectively and safely react against downward forces exerted by his or her other hand when using the portable computing device as a keyboard.

A stabilising device in accordance with the present invention also allows a user to stably and securely hold the portable computing device when taking photos or videos, or when displaying information on the portable computing device to other people.

The base plate may be housed in a casing configured to be mounted on the portable computing device. The base plate may be rotatable relative to the casing.

The at least one spacer element may be connected to the base plate by means of a pivotal connection. The at least one spacer element may be connected to the finger support member by means of a pivotal connection.

The stabilising device may comprise a further spacer element connected to the finger support member and to the base plate.

The further spacer element may be connected to the finger support member by means of a pivotal connection.

The further spacer element may be connected to the base plate by means of a pivotal connection.

The pivotal connection between the further spacer element and the base plate may be provided between the further spacer element and a slidable element in communication with the base plate, the slidable element being slidable such that the finger support member can move between the closed position and the open position.

The slidable element may be housed in a recess in the base plate.

The recess may define a channel in which the slidable element can move.

The at least one spacer element and/or the further spacer element may be connected to a central portion of the finger support member.

The finger support member may comprise first and second ends extending from opposite sides of a central portion thereof.

The finger support member may comprise guide means at an edge of the finger support member. The guide means may comprise at least one arcuate element arcing in a direction away from the base plate.

At least the base plate, the finger support member and the at least one spacer element may be integrally formed.

The base plate may comprise one or more channels for guiding a user's fingers toward the finger support member and at least one spacer element.

The stabilising device may further comprise a retaining element to secure the finger support member in the closed position when not in use.

At least one of the base plate, the finger support member and/or the at least one spacer element may be configured to be releasably secured to a display bracket.

According to a second aspect of the present invention there is provided the use of a stabilising device according to the first aspect for holding a portable computing device.

According to a third aspect of the present invention there is provided a system comprising a portable computing device and a stabilising device according to the first aspect.

The system may further comprise a display bracket configured to receive the stabilising device.

The display bracket may be configured to be attached to a wall or other vertical surface. The display bracket may be a self-supporting display stand. The display bracket may be configured to engage with and be releasably securable to one or more of the base plate, the finger support member and/or the at least one spacer element.

DETAILED DESCRIPTION OF THE INVENTION

Stabilising Device

The stabilising device and its components may be formed from any rigid or non-flexible material by thermo-forming or injection moulding techniques. Particularly preferred materials are polycarbonate, polypropylene, polyethylene or nylon.

The stabilising device should be of appropriate dimensions to be mountable onto the rear side of a portable computing device such as a tablet computer, and of dimensions such that a user can engage the device with his or her hand in a manner described herein.

The stabilising device may be mounted onto the rear face of a portable computing device by any means suitable to allow rotation of the stabilising device relative to the portable computing device. For example, the stabilising device may be mounted onto the rear face of the portable computing device by means of a coupling fixture or connector plate which is permanently fixed to the rear face of the portable computing device. The stabilising device may then be releasably mounted onto the connector plate and be rotatable relative to the connector plate and portable computing device. Alternatively, the stabilising device may comprise a connector plate, to which the base plate is connected The connector plate may be releasably mounted onto the rear face of the portable computing device. The connector plate may be releasably mounted onto the rear face of the portable computing device by means of an adhesive pad. Alternatively, the connector plate may be provided with a plurality of microsuction pads which enable it to be releasably mounted onto the rear face of the portable computing device.

Alternatively, the stabilising device may be housed in a casing. The casing may be of similar dimensions to the portable computing device such that it snap-fits around the periphery of the portable computing device. The snap-fit may be provided just at the corners of the portable computing device, and/or around the sides of the device. This arrangement allows the stabilising device and casing to be releasably attachable from the portable computing device.

The stabilising device may be housed in a casing such that a portion of the stabilising device projects through a cut away portion of the casing and a portion of the stabilising device remains housed in the casing. Due to the foldable nature of the part of the stabilising device which engages with a user's hand, the stabilising device may be flush with the casing when in a closed position. This arrangement ensures that the casing does not substantially increase the depth of the portable computing device, and that the sleek profile is maintained when the stabilising device is in the closed position.

The stabilising device comprises a base plate which is configured to be attached to the portable computing device in any suitable manner, including those described above, and is rotatable relative to the portable computing device. The base plate may be housed within a casing into which the portable computing device can be inserted, with the rest of the stabilising device projecting through a cut away portion of the casing.

The region of the casing adjacent the base plate, and/or the base plate may be provided with a roughened or textured surface providing additional grip for the fingers of a user's hand.

The device comprises a finger support member against which a user can brace his or her fingers. Preferably the finger support member comprises an elongate body with first and second ends extending from opposite sides of a central portion. Alternatively, the finger support member may be a substantially circular disc. The finger support member may be planar. The underside of the finger support member may be contoured to accommodate a user's fingers.

The device also comprises at least one spacer element connected to the base plate. The at least one spacer element may be formed from any substantially rigid material. In an alternative embodiment, the at least one spacer element may be formed from an elastically deformable material. The at least one spacer element may be connected to the base plate by any suitable means, such as any bonding or welding means. The connection may be a direct or indirect connection.

In the embodiment where the at least one spacer element is indirectly connected to the base plate, the at least one spacer element may be connected to a connecting plate in communication with the base plate. The at least one spacer element may be connected to the connecting plate by means of a first pivotal connection. Alternatively, the at least one spacer element may be directly connected to the base plate. The at least one spacer element may be connected to the base plate by means of a first pivotal connection.

Advantageously, the at least one spacer element and base plate are integrally formed from the same material. In this embodiment, the pivotal connection may comprise a fold, notch or groove formed between the at least one spacer element and the base plate. However, the base plate and the at least one spacer element may be separately formed, in which case other pivotal connections, for example pivot pins, may be used.

The stabilising device may be provided with a retaining element 42 to secure the finger support member 12 in the closed position. The retaining element 42 may be disposed on the base plate 10 or connecting plate 24. Alternatively, the retaining element 42 may be disposed on the casing 6. The retaining element 42 may be adapted to engage with the pivotal connection between the slidable element and the at least one spacer element. In the embodiment wherein the pivotal connection between the slidable element 8 and the at least one spacer element 14 is a fold in the material, the retaining element 42 may comprises a projection configured to engage with the fold.

Advantageously, the at least one spacer element and finger support member are integrally formed from the same material. In this embodiment, the pivotal connection may comprise a fold, notch or groove formed between the at least one spacer element and the finger support member. However, the finger support member and the at least one spacer element may be separately formed, in which case other pivotal connections, for example pivot pins, may be used.

When the at least one spacer element and the finger support member are integrally formed from the same material, or when the base plate and/or the connecting plate and the at least one spacer element are integrally formed from the same material, or when the base plate, and/or the connecting plate and the at least one spacer element and the finger support member are integrally formed from the same material, suitable examples of materials include but are not limited to polypropylene, polyethylene or nylon. Such an integrated component can be formed by any known process, for example injection moulding.

The stabilising device may further comprise a slidable element disposed within the base plate. The slidable element may be in communication with the base plate. The slidable element may be housed in a recess in the base plate. The recess may be defined in part by the recess in which the connecting plate is located. The connecting plate may define at least in part the recess in which the slidable element may be housed. The recess may be defined at least in part by one or more retaining channels disposed within the base plate. The one or more retaining channels may engage with the slidable element such that the slidable element is restricted to bidirectional movement (i.e. backward and forward) in the plane of the base plate. The slidable element may be in constant communication with the base plate.

The device may also comprise a further spacer element connected to the finger support member. The further spacer element may be a second spacer element or a third spacer element. The further spacer element may be connected to a central portion of the finger support member. The further spacer element may be connected to the finger support member by means of a pivotal connection.

Advantageously, the further spacer element and finger support member are integrally formed from the same material. In this embodiment, the pivotal connection may comprise a fold, notch or groove formed between the further spacer element and the finger support member. However, the finger support member and the further spacer element may be separately formed, in which case other pivotal connections, for example pivot pins, may be used.

The further spacer element may be connected to the base plate. The connection may be a direct or indirect connection. In the embodiment where the further spacer element is indirectly connected to the base plate, the further spacer element may be connected to the slidable element which is in communication with the base plate. In this embodiment, a pivotal connection may be provided between the further spacer element and the slidable element.

Alternatively, the further spacer element may be directly connected to the base plate. The further spacer element may be connected to the base plate by means of a pivotal connection. The further spacer element may be pivotally connected to the finger support member and pivotally connected to the slidable member.

The finger support member may be provided with guide means at an edge of the finger support member. The guide means preferably comprises at least one arcuate element arcing in a direction away from the rear side of the portable computing device. The guide means may serve to guide user's index finger and middle finger either side of the spacer element and underneath the finger support member.

In the embodiment comprising the finger support member, the at least one spacer element, and also one or more of a slidable portion, a further spacer element and guide means, these may be integrally formed from the same material. The base plate and/or connecting plate may also be integrally formed with the finger support member, the at least one spacer element, and also one or more of a slidable portion, a further spacer element and guide means. The complete stabilising device may thus be integrally formed. Any rigid material which can accommodate hinges in the form of folds as described previously may be used. Suitable examples include but are not limited to polypropylene, polyethylene or nylon. Such an integrated component can be formed by any known process, for example injection moulding.

Once produced, such a component can be mounted on the rear side of a portable computing device by locating the slidable element in a channel defined by the base plate mounted on the rear side of the portable computing device, and by providing a pivotal connection between the further spacer element and the base plate or between the further spacer element and the connecting plate.

The slidable element may be integrally formed with the at least one spacer element and located within the base plate prior to the base plate being mounted on the rear side of the portable computing device. The pivotal connection between the further spacer element and the base plate or between the further spacer element and the connecting plate may be formed by welding or bonding of the two materials.

The base plate may be retained within a casing through a close-fitting engagement with the casing and the portable computing device. Alternatively, the base plate may be retained within a casing by means of a snap-fit or push-fit engagement with the rim of a cut away portion of the casing, or by any other suitable means such that the base plate is rotatable relative to the casing.

When housed within the casing, the base plate may be in direct contact with the rear side of the portable computing device. The base plate may be formed of a non-abrasive material, or be coated with a non-abrasive material such that the aesthetic finish of the rear face of the portable computing device is not damaged by the rotation of the base plate.

The stabilising device may be provided with a retaining element to secure the finger support member in the closed position. The retaining element may be disposed on the base plate or connecting plate. Alternatively, the retaining element may be disposed on the casing. The retaining element may be adapted to engage with the pivotal connection between the slidable element and the at least one spacer element. In the embodiment wherein the pivotal connection between the slidable element and the at least one spacer element is a fold in the material, the retaining element may comprises a projection configured to engage with the fold.

In the embodiment wherein the at least one spacer element is elastically deformable, the spacer element may be biased in favour of the closed position. In such an embodiment, the finger support member will be naturally retained in, or biased towards, the closed position. Further, the stabilising device may possess a single spacer element and optionally a single finger support member.

Optionally, the underside of the finger support member may be provided with a layer of cushioning material. In use, the back of a user's fingers will contact the underside of the finger support member. The presence of the cushioning material provides extra comfort.

Use of the Stabilising Device

In use, a stabilising device according to the present invention allows a user to effectively hold and support a portable computing device in one hand, and react against the rotational forces which are exerted when, with his or her other hand, the user rotates the portable computing device from one orientation to the other, for example from a landscape orientation to a portrait orientation.

As the portable computing device is slipped toward the supporting hand, the user can insert two fingers can insert into the device, one either side of the spacer element. This process may be facilitated first of all by first and second channels which may be provided in the surface of the base plate and/or the slidable element which serve to align the user's fingers ready for insertion into the device. Once the user's fingers reach the finger support member and its first and second ends, guide means provided on an edge of the first and second ends guide the user's fingers either side of the spacer element and under the first and second ends. Through this action, the user's fingers cause the device to move from a closed position to an open position, wherein the finger support member is spaced from the base plate.

References to a closed position of the device, to a closed position of the finger support member, to a closed position of the slidable element and to a position in which the finger support member and its first and second ends are substantially flush with the base plate may be taken to mean those positions in which the central portion and first and second ends of the finger support member are in contact with or in close proximity to the base plate.

References to an open position of the device, to an open position of the finger support member, to an open position of the slidable element and to a position in which the central portion of the finger support member and its first and second ends are spaced from the base plate may be taken to mean those positions in which the central portion of the finger support member and its first and second ends are no longer in contact with or in close proximity to the base plate. For example, the spacer elements may form an angle, for example an oblique angle or a right angle with the finger support member, the base plate or with the slidable element. In such positions, for example, a user's index and middle fingers can be inserted either side of the spacer element and between the base plate and the first and second ends of the finger support member.

In one mode of use, once the user has inserted one finger either side of the spacer element and caused the device to move to an open position, the backs of the fingers will contact the underside of the first and second ends of the finger support member. This intimate contact, together with the intimate contact of the tips of all four fingers and thumb with the base plate, enables the user to brace his or her hand against the first and second ends of the finger support member and against the base plate.

This braced position provides the user with control over the stabilising device and the ability to react against the rotational forces applied when the orientation of the associated portable computing device is switched. This mode of use also allows a user to react to downward forces that may be generated when the user contacts the touchscreen at the periphery of the portable computing device with her or her other hand, for example when typing.

In an alternative mode of use, particularly for a stabilising device provided with two spacer elements, the user can insert one finger either side of the spacer elements and cause the device to move to an open position. In this mode of use, the user does not need to brace against the finger support member, instead relying on the interaction between the two spacer elements and the two fingers to provide the necessary resistance to the rotational forces applied when the orientation of the associated portable computing device is switched.

A stabilising device in accordance with the invention may be retro-fitted to any existing portable computing device, providing a user with a greater degree of control. Depending on the mode of mounting on the portable computing device, the casing may be manufactured to appropriate dimensions to fit any portable computing device. Alternatively, the stabilising device may be mounted onto the portable computing device by way of a coupling or connecting fixture as previously described.

In addition, the stabilising device is discreet when in use, such that user appears to be effortlessly supporting a portable computing device in one hand yet is able to smoothly rotate its orientation using the other hand. As a result of the device folding away into its closed position, a portable computing device comprising such a stabilising device can be carried in the normal manner, with the appearance of the casing being that of just a protective cover.

In a yet further mode of use, the stabilising device described herein can be provided as part of a system in combination with a portable computing device. The system may also include a display bracket which is configured to receive the stabilising device.

The display bracket may be configured to be attached to a wall or other vertical surface. For example, the display bracket may be directly attached to a wall or surface by means of screws, or indirectly attached to a wall or surface by means of a picture hook. Alternatively, the display bracket may be a self-supporting display stand, for example a cradle type device which could be placed on a user's office desk.

The display bracket may be configured to engage with and be releasably securable to one or more of the base plate, the finger support member and/or the at least one spacer element. For example, the display bracket may comprise a horizontal bar, over which the guide means of the finger support member can be hooked. Alternatively, the display bracket may comprise one or more recesses which are configured to receive the guide means of the finger support member.

By engaging the stabilising device described herein with a display bracket as described above, a user can still rotate an associated portable computing device even when not holding the device in his or her hand, for example when the portable computing device is mounted on a wall or supported on a desk by the stabilising device and accompanying bracket.

BRIEF DESCRIPTION OF THE DRAWINGS

The invention will now be described, by way of example only and without limitation, with reference to the accompanying drawings, in which:

FIG. 4A shows a side view of a portable computing device provided with a stabilising device, in which the stabilising device is in the open position;

FIG. 4B shows a side view of a portable computing device provided with a stabilising device, in which the stabilising device is in the closed position.

DETAILED DESCRIPTION OF THE DRAWINGS

Figure 1:
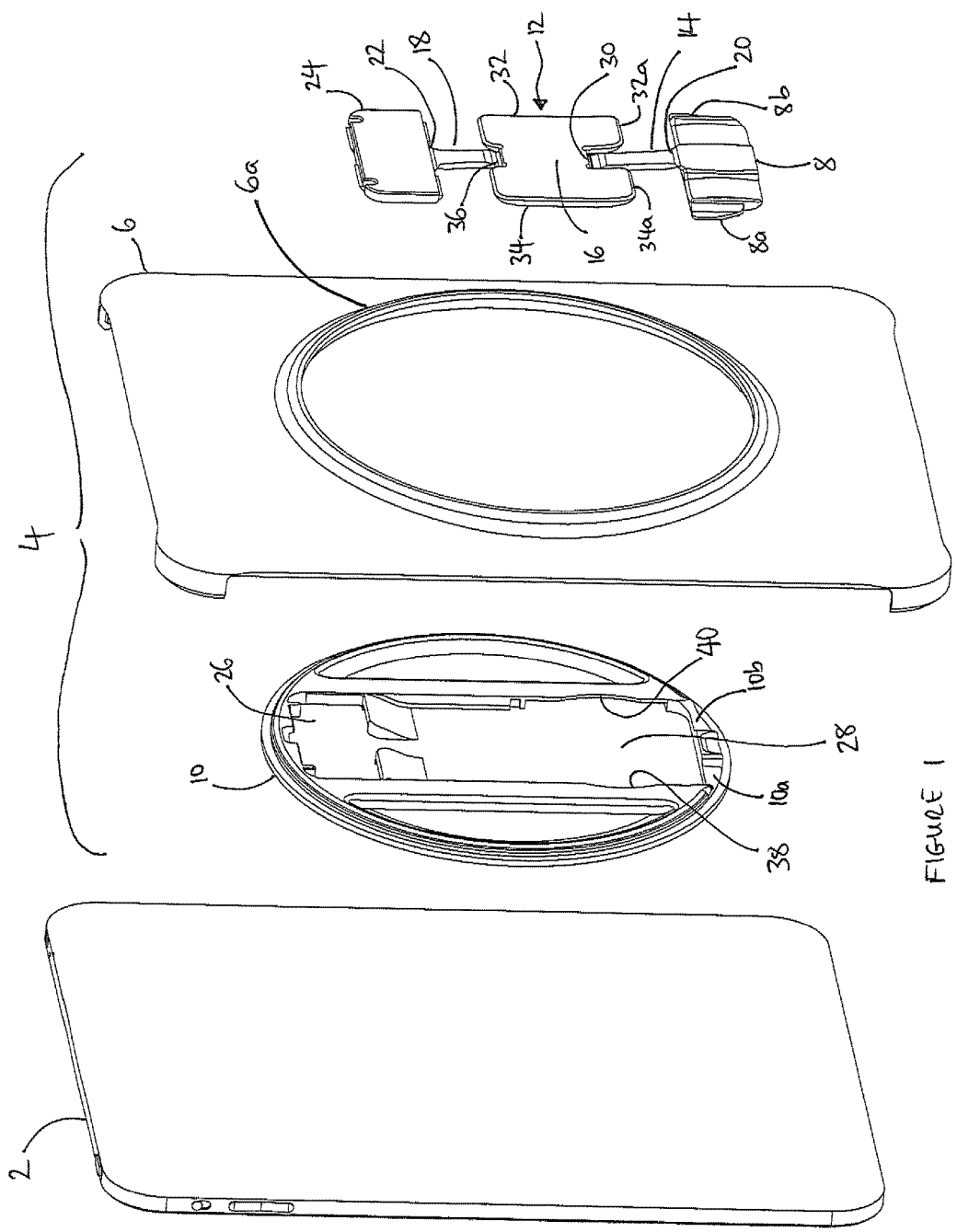
FIG. 1 illustrates an exploded view of one possible construction of a stabilising device according to the present invention together with a portable computing device.

FIG. 1 shows an exploded view of one possible construction of a stabilising device adjacent to a portable computing device 2. The components of the stabilising device are indicated generally at 4. The stabilising device comprises a base plate 10 to be housed in a cover or casing 6 which comprises projections at each corner in order to provide a snap fit connection with portable computing device 2. Casing 6 is provided with a hole 6a which is configured to receive base plate 10, and through which the rest of the stabilising device can project. Base plate 10 is provided with channels 10a and 10b which serve to guide a user's fingers when a user is engaging with stabilising device 4.

Stabilising device 4 comprises finger support member 12 which is integrally formed with a spacer element 14, and a further spacer element 18. Spacer element 14 is pivotally connected to finger support member 12 by way of fold, notch or groove 30, and further spacer element 18 is pivotally connected to finger support member 12 by way of fold, notch or groove 36.

Spacer element 14 is connected at its other end to slidable element 8. Spacer element 14 is pivotally connected to slidable element 8 by way of fold, notch or groove.

Further spacer element 18 is pivotally connected to connecting plate 24 at pivot point 22. Connecting plate 24 is configured to be fixed to base plate 10. In the embodiment shown, base plate 10 is provided with a first recess 26 into which connecting plate 24 can be inserted, for example as a snap fit or push fit connection, and a second recess 28 configured to receive slidable element 8. Recess 28 is provided with retaining channels 38, 40 which are configured to engage with flanges 8a and 8b provided on slidable element 8. The edges of first and second spacer elements 14, 18 which contact a user's fingers may be concave for better engagement. However, first and second spacer elements 14, 18 may also be straight-sided.

Finger support member shown generally at 12 comprises first and second ends 32, 34 extending from opposite sides of central portion 16 of finger support member 12. First and second ends 32, 34 comprise elongate members and are provided with guide means 32a and 34a respectively. Guide means 32a and 34a are in the form of arcuate elements extending from first and second ends 32, 34 arcing in a direction away from the underside of the tray.

Figures 2A, 2B:
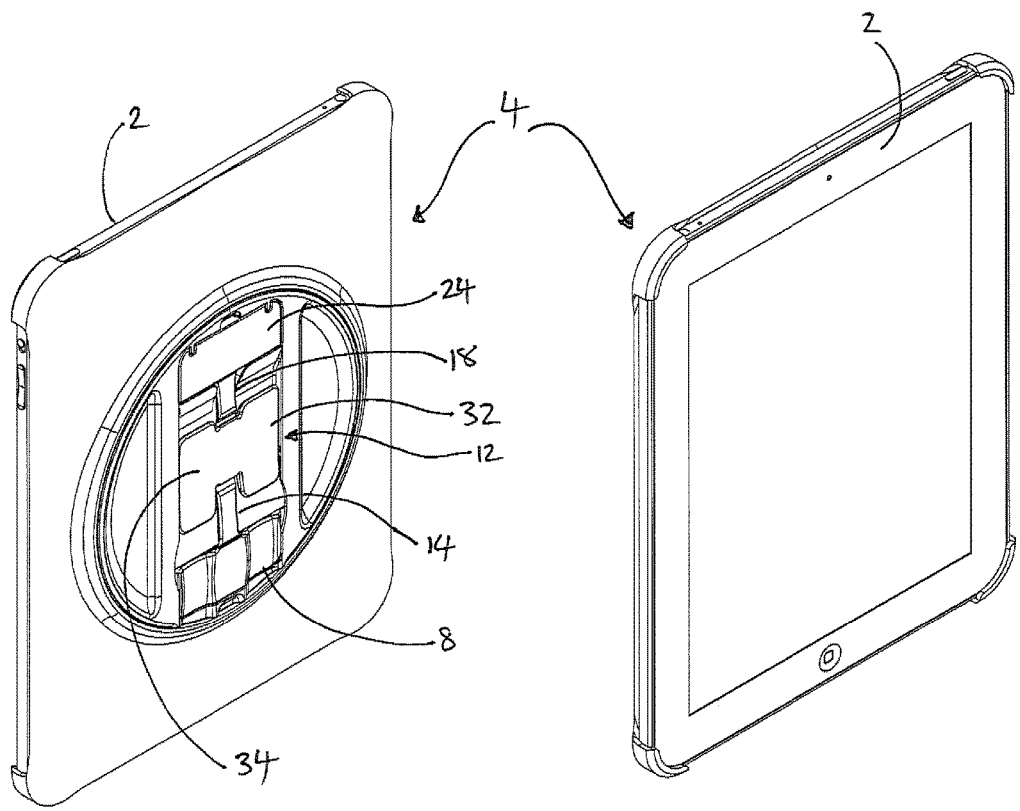
FIGS. 2A and 2B respectively show back and front views of a portable computing device provided with a stabilising device.

FIGS. 2A and 2B respectively show the rear side and front side of a portable computing device 2 comprising a stabilising device, shown generally at 4. The projections at each corner of casing 6 have engaged with the respective corners of the portable computing device to provide the snap fit connection.

In the embodiment of FIG. 2A, connecting plate 24 has been fitted into first recess 26 (no longer visible) and slidable element 8 has been located in second recess 28. Second recess 28 defines a channel to restrict the slidable portion to backward and forward motion only with no, or only minimal, lateral movement possible.

In the embodiment of FIG. 2A, stabilising device 4 is presented in the closed position. In this closed position, first and second spacer elements 14, 18 and first and second ends 32, 34 of finger support member 12 are substantially co-planar to each other, to slidable portion 8, and to base plate 10, and are in contact with base plate 10.

Figure 3A:
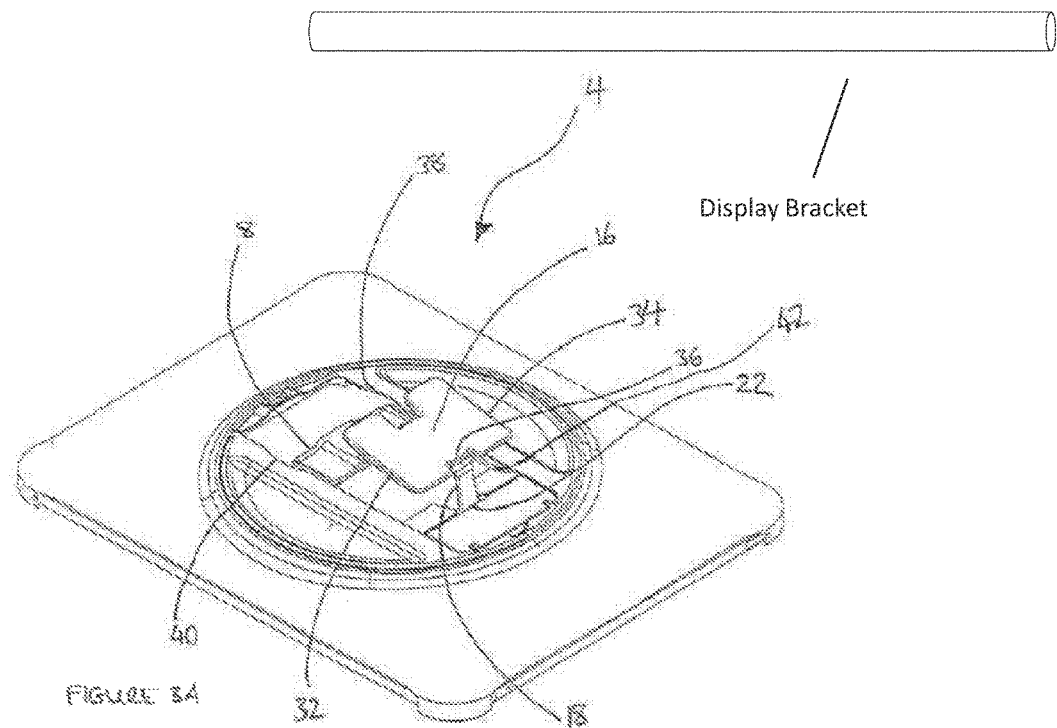
FIG. 3A shows the rear face of a portable computing device provided with a stabilising device, in which the stabilising device is in the open position.

FIG. 3A shows stabilising device 4 in an open position. As can be seen, slidable element 8 has moved, in the direction of insertion, from its closed position to its open position. In doing so, and as a result of pivots 20 (not visible), 22, 30 (not visible) and 36, slidable element 8 has caused first and second spacer elements 14 (not visible) and 18 to form angles with finger support member 12, slidable portion 8 and base plate 10. In this open position, central portion 16 and first and second ends 32, 34 of support member 12 have become spaced from base plate 10. Movement of slidable portion 8 is restricted to forward and backward movement only due to recess 28 and retaining channels 38 and 40 which are disposed on either side of recess 28 and which engage with flanges 8a and 8b (not visible) of slidable element 8.

First and second ends 32, 34 of finger support member 12 which engage with the backs of the user's fingers are able to self align with the user's fingers due to the four pivots 20, 22, 30 and 36 and the sliding action of slidable element 8. This arrangement spreads the load over as broad an area as possible, providing maximum possible comfort for the user, and also provides a broad face against which the user can brace his or her hand in order to resist any rotation of the device.

Advantageously, due to the pivotal connections 20, 22, 30 and 36 the slidable element can slide to its open position as shown in FIG. 3A, and the device opens or unfolds in the direction of insertion. Accordingly, the user meets no resistance and can engage with the device smoothly.

Figure 3B:
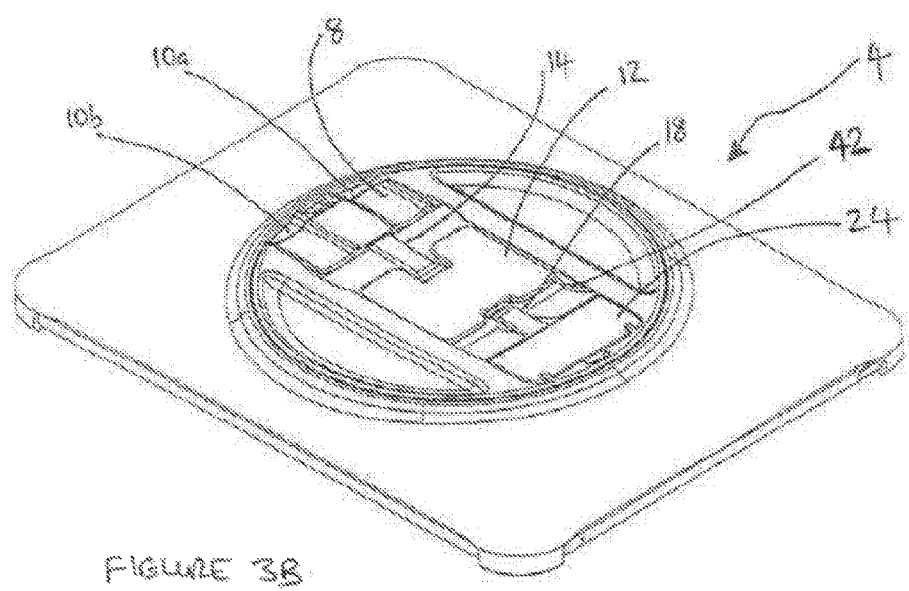
FIG. 3B shows the rear face of a portable computing device provided with a stabilising device, in which the stabilising device is in the closed position.

FIG. 3B shows stabilising device 4 returned to the closed position, in which slidable element 8, first and second spacer elements 14, 18, finger support member 12 and connecting plate 24 are all co-planar and in contact with base plate 10. Guide channels 10a and 10b of base plate 10 are now aligned with corresponding channels on slidable element 8, ready for the next time that a user begins to engage the device.

FIG. 4A shows a portable computing device provided with stabilising device 4 from a side view, in which stabilising device 4 is in the open position. As can be seen in FIG. 4A, spacer element 14 has a greater length than spacer element 18. However, spacer element 14 and further spacer element 18 may be of the same length, or further spacer element 18 may be longer than spacer element 14. Guide means 32a and 34a serve to guide a user's fingers into the device, one either side of the spacer element 14 and underneath first and second ends 32, 34 of finger support member 12. This ensures that the user engages the device 4 smoothly and doesn't encounter any resistance.

By engaging the device 4 in this manner, a user can cause device 4 to move from a closed position (FIG. 4B) to an open position, as indicated in FIG. 4A. When not in use, first and second spacer elements 14, 18 and finger support member 12 can be folded away flat into the closed position, housed in second recess 28 in base plate 10. FIG. 4B shows a portable computing device provided with stabilising device 4 from a side view, in which stabilising device 4 is in this closed position and shows that first and second spacer elements 14, 18 and finger support member 12 are completely contained within cover or casing 6, such that the sleek appearance of portable computing device 2 is maintained.

Figure 5A:
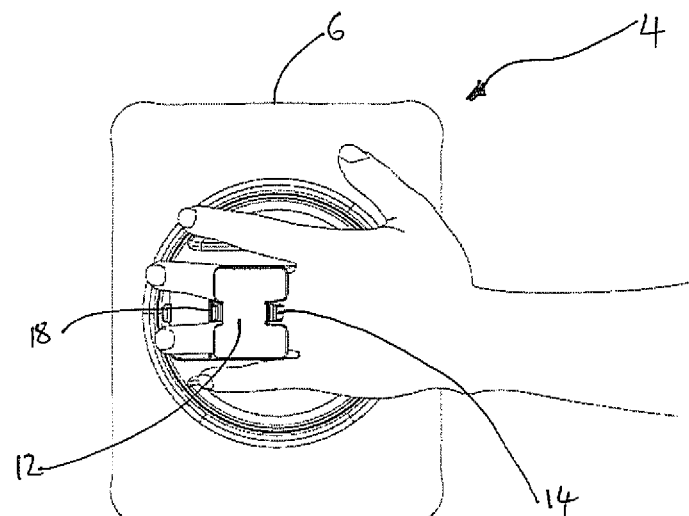
FIGS. 5A to 5C show a user holding a portable computing device provided with a stabilising device, and the rotation of the portable computer device relative to the user's hand.
Figure 5B:
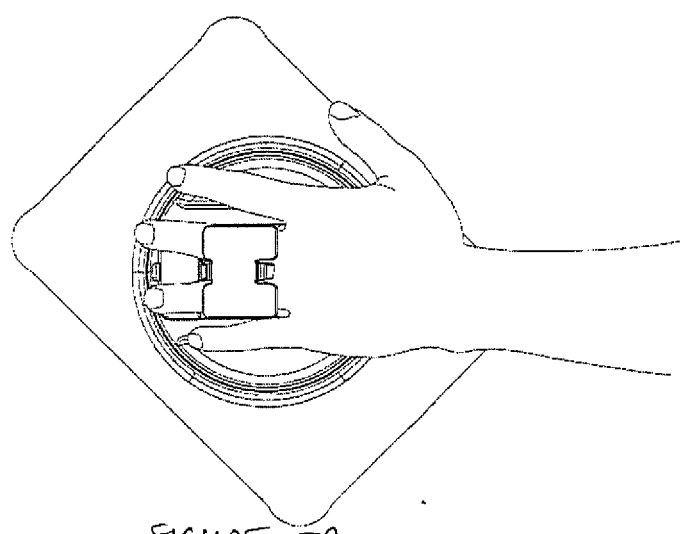
Figure 5C:
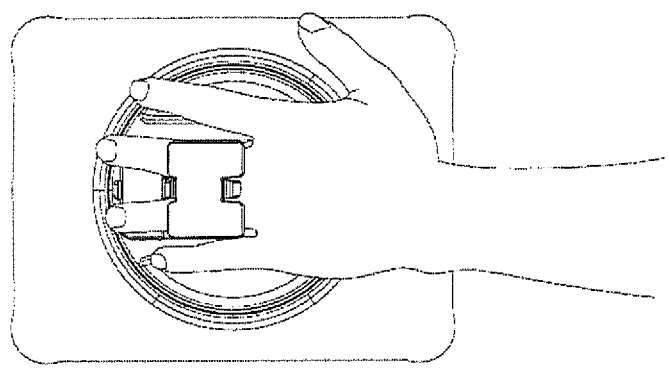

FIGS. 5A to 5C show a user engaged with stabilising device 4, and the rotation of cover or casing 6, which may contain a portable computing device, relative to the user's hand. By engaging with finger support member 12 and/or first and second spacer elements 14, 18, a user can safely hold a portable computing device contained within cover of casing 6 and effectively resist rotation of a portable computing device contained within cover of casing 6 without risk of fumbling or dropping the device.

In the embodiment of FIGS. 5A to 5C, the user has engaged stabilising device 4 with the middle and ring finger of his or her left hand. However, it will be understood that it would also be possible to engage stabilising device 4 with the index finger and middle finger, for example. In the embodiment shown in FIGS. 5A to 5C, stabilising device 4 is provided with first and second spacer elements 14, 18. In this embodiment, a user can simply allow first and second spacer elements 14, 18 to rest between his or her middle and ring fingers. When cover or casing 6 is rotated, one of first and second spacer elements 14, 18 contacts the middle finger and the other of first and second spacer elements 14, 18 contacts the ring finger, thus providing contact points to resist rotation. In the embodiment in which only one finger support member is provided, rotation of casing or cover 6 (containing a portable computing device) can be resisted by bracing the his or her finger tips against base plate 10 and the backs of those fingers against first and second ends 32, 34 of finger support member 12.

The user can very easily disengage from stabilising device 4, either by withdrawing the fingers in the opposite direction to that in which the fingers were originally inserted, or by simply parting his or her fingers beyond the outer edges of the first and second ends 32, 34 of finger support member 12. The four-pivot sliding and folding system allows the user's hand to be withdrawn easily without any jamming or excess friction.

The stabilising device as described herein enables a user to discreetly hold a portable computing device, and safely and securely rotate the portable computing device depending on a preferred orientation without fear of fumbling or dropping the portable computing device. When not in use, the stabilising device described herein can be folded away into a closed position in which it is retained within its cover for the portable computing device so as to maintain the sleek appearance of the portable computing device.

The invention claimed is:

1. A stabilising device for a portable computing device, the stabilising device comprising:
    a base plate configured to be mounted on the portable computing device and rotatable relative to the portable computing device;
    a unitary finger support member;
    a first spacer element connected to the unitary finger support member and to the base plate; and
    a second spacer element connected to the unitary finger support member and to the base plate;
    wherein, the unitary finger support member is moveable between a closed position in which the unitary finger support member is substantially flush with the base plate and an open position in which the unitary finger support member is spaced from the base plate such that a user can insert at least one unitary finger between the base plate and the unitary finger support member.

2. A stabilising device according to claim 1, wherein the base plate is releasably mounted onto the rear face of the portable computing device.

3. A stabilising device according to claim 1, wherein the base plate is housed in a casing configured to be mounted on the portable computing device.

4. The stabilising device according to claim 3, wherein the base plate is rotatable relative to the casing.

5. The stabilising device according to claim 1, wherein the first spacer element is connected to the base plate by means of a pivotal connection.

6. The stabilising device according to claim 1, wherein the first spacer element is connected to the unitary finger support member by means of a pivotal connection.

7. The stabilising device according to claim 1, wherein the second spacer element is connected to the unitary finger support member by means of a pivotal connection.

8. The stabilising device according to claim 1, wherein the second spacer element is connected to the base plate by means of a pivotal connection.

9. The stabilising device according to claim 8, wherein the pivotal connection is provided between the second spacer element and a slidable element in communication with the base plate, the slidable element being slidable such that the unitary finger support member can move between the closed position and the open position.

10. The stabilising device according to claim 9, wherein the slidable element is housed in a recess in the base plate.

11. The stabilising device according to claim 10, wherein the recess defines a channel in which slidable element can move.

12. The stabilising device according to claim 1, wherein at least one of the first spacer element and the second spacer element is/are connected to a central portion of the unitary finger support member.

13. The stabilising device according to claim 1, wherein the unitary finger support member comprises first and second ends extending from opposite sides of a central portion thereof.

14. The stabilising device according to claim 13, wherein the unitary finger support member comprises guide means at an edge of the unitary finger support member.

15. The stabilising device according to claim 14, wherein the guide means comprise at least one arcuate element arcing in a direction away from the base plate.

16. The stabilising device according to claim 1, wherein at least the base plate, the unitary finger support member and the first spacer element are integrally formed.

17. The stabilising device according to claim 1, wherein the base plate comprises one or more channels for guiding a user's fingers toward the unitary finger support member and the first spacer element.

18. The stabilising device according to claim 1, wherein the stabilising device further comprises a retaining element to secure the unitary finger support member in the closed position when not in use.

19. The stabilising device according to claim 1, wherein at least one of the base plate, the unitary finger support member and/or the first spacer element is configured to be releasably secured to a display bracket.

20. A stabilising device for a portable computing device, the stabilising device comprising:
    a base plate configured to be mounted on the portable computing device and rotatable relative to the portable computing device;
    a finger support member having a first side and a second side;
    a first spacer element connected to the first side of the finger support member and to the base plate; and
    a second spacer element connected to the second side of the finger support member and to the base plate;
    wherein, the finger support member is moveable between a closed position in which the finger support member is substantially flush with the base plate and an open position in which the finger support member is spaced from the base plate such that a user can insert at least one finger between the base plate and the finger support member; and
    wherein the base plate is rotatable when the finger support member is in the closed position.

* * * * *